United States Patent [19]

D'Agostino et al.

[11] Patent Number: 4,468,441
[45] Date of Patent: Aug. 28, 1984

[54] SEPARATOR MEMBRANES FOR REDOX-TYPE ELECTROCHEMICAL CELLS

[75] Inventors: Vincent F. D'Agostino, Huntington; Joseph Y. Lee, Lake Grove, both of N.Y.

[73] Assignee: RAI Research Corp., Hauppauge, N.Y.

[21] Appl. No.: 425,973

[22] Filed: Sep. 28, 1982

Related U.S. Application Data

[63] Continuation-in-part of Ser. No. 307,588, Oct. 1, 1981, Pat. No. 4,414,090.

[51] Int. Cl.³ ............... H01M 4/36; H01M 2/16; C25B 9/00; C25B 13/08
[52] U.S. Cl. ........................ 429/105; 429/251; 429/254; 204/252; 204/296
[58] Field of Search .......... 204/296, 252; 429/5, 429/12, 14, 17, 27, 105–109, 245, 249, 254–255, 250, 251

[56] References Cited

U.S. PATENT DOCUMENTS

| | | | |
|---|---|---|---|
| 3,427,206 | 2/1969 | Scardaville et al. | 429/254 X |
| 4,107,005 | 8/1978 | D'Agostino et al. | 204/252 X |
| 4,230,549 | 10/1980 | D'Agostino et al. | 429/250 X |
| 4,384,941 | 5/1983 | Okamoto et al. | 204/296 X |
| 4,414,090 | 11/1983 | D'Agostino et al. | 204/252 |

FOREIGN PATENT DOCUMENTS

| | | | |
|---|---|---|---|
| 64423/80 | 11/1980 | Australia | 204/296 |
| 860405 | 2/1961 | United Kingdom | 204/296 |

Primary Examiner—Donald R. Valentine

[57] ABSTRACT

This disclosure is directed to improved redox type electrochemical cells, preferably those of the iron (+3)/iron (+2) or chromium (+3)/iron (+2) electrolyte variety, incorporating polymeric, ion-exchange separator membranes produced by radiation grafting techniques.

10 Claims, 5 Drawing Figures

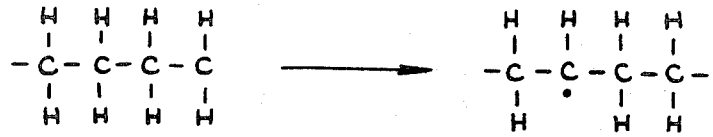
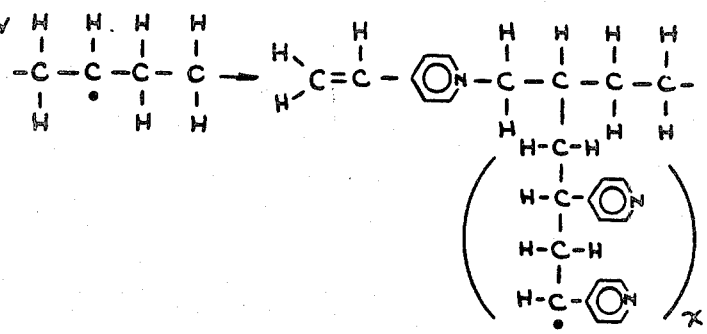
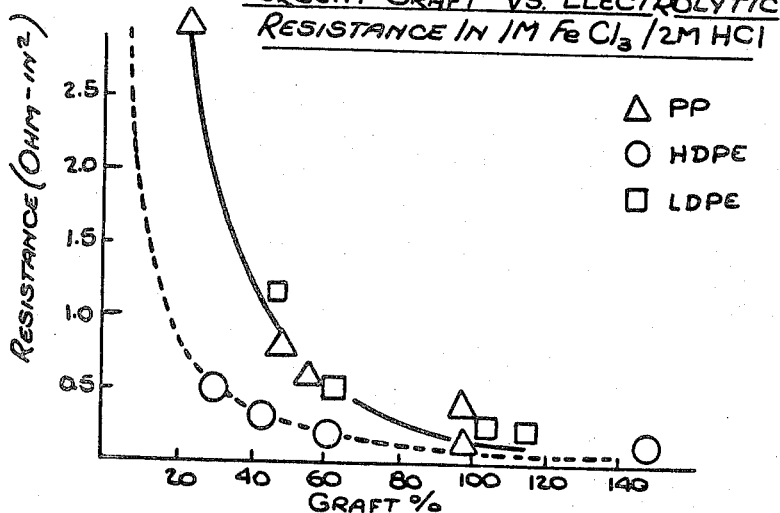

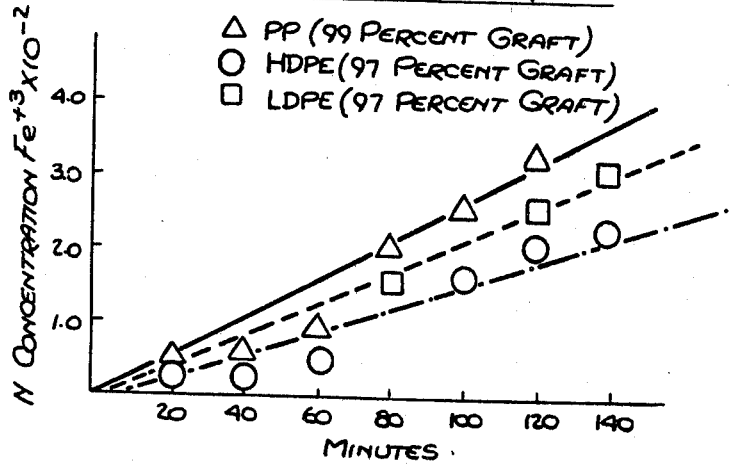
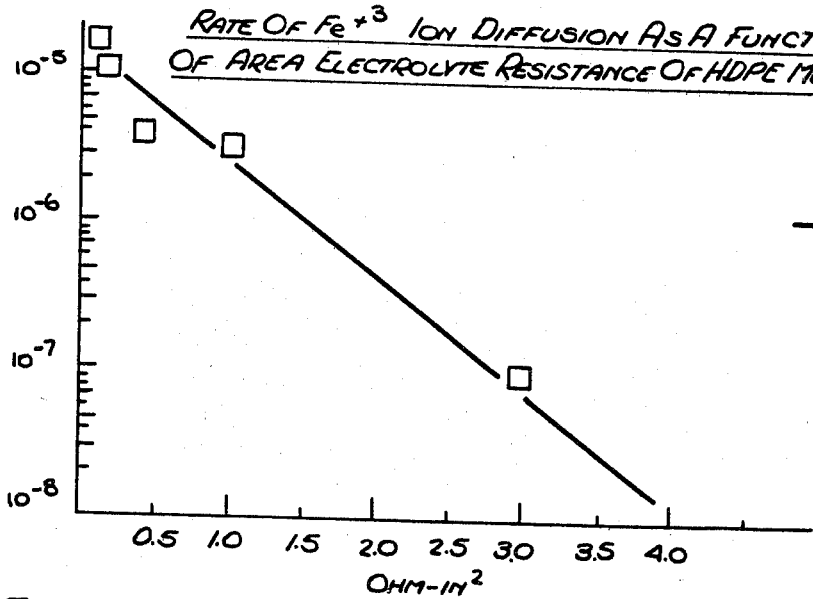
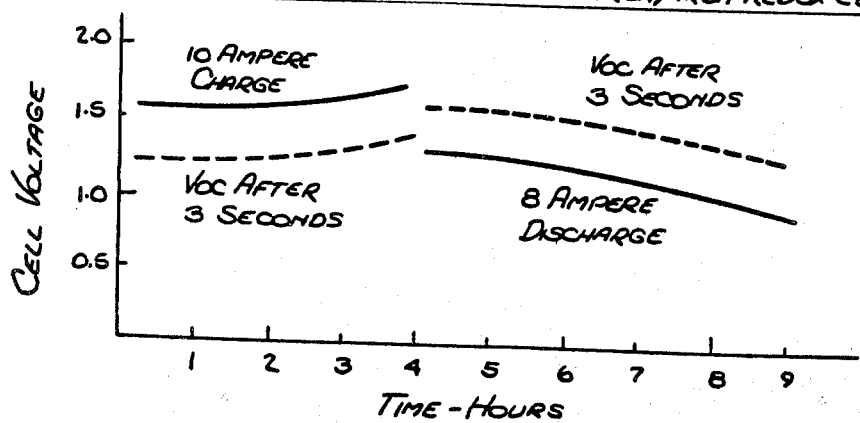

SEPARATOR MEMBRANES FOR REDOX-TYPE ELECTROCHEMICAL CELLS

RELATED U.S. APPLICATION DATA

This application is a continuation-in-part of U.S. application Ser. No. 307,588 filed Oct. 1, 1981; now U.S. Pat. No. 4,414,090.

BACKGROUND OF THE INVENTION

Basically, an electrochemical cell, or battery, is made up of two half-cells, each comprising an electronic conducting phase, or electrode, in contact with a second phase called an electrolyte, in which ionic conduction takes place. During discharge the electrolyte loses electrons to one of the electrodes thereby reducing that electrode. At the other electrode the electrolyte gains electrons, thereby oxidizing that electrode. The electrolyte associated with the positive electrode is referred to as the posilyte or catholyte and the electrolyte associated with the negative electrode is referred to as the negalyte or anolyte. In some cells the posilyte and negalyte are different solutions and therefore require a separator membrane to prevent the two solutions from physically mixing. In the other types of cells the posilyte and the negalyte are the same, in which case the separator functions to physically separate the electrodes. These membranes should not, however, prevent ionic conduction between the posilyte and the negalyte.

Basic electrochemical cells may be classified as primary or secondary. Examples of primary battery systems are those having electrodes made of the active metal pairs mercury-zinc, silver-zinc, lead-zinc, copper-zinc, copper-magnesium, and silver-magnesium. Primary cells are generally not rechargeable. Examples of the most common secondary battery systems are those having electrodes made of the active metal pairs nickel-cadmium, silver-zinc and silver-cadmium. Secondary cells are rechargeable electrically by passing a current through the cell in a direction reversed from that of discharge. A common electrolyte used in both primary and secondary cells is a 30 to 45% solution of potassium hydroxide.

In contrast to the above primary or secondary batteries, which employ pairs of active-metal electrodes held within the cell, the active material in the redox-battery is stored outside of the cell, in the form of pairs of solutions, or electrolytes. Storing the active materials in this manner gives the battery a long shelf-life, and the capacity of the battery can be increased by increasing the amount of electrolyte. The heart of the system is the reactor cell where reduction and oxidation of the active species in the electrolyte occurs. The basic cell consists of two inert electrodes, which are commonly formed of carbon, separated by a separator membrane. On discharge, chemical energy is converted into electrical energy when the two reactive electrolytes are pumped through the cell compartments. During the charging stage, electrical energy is converted back to chemical energy and again, the two electrolytes are pumped through the cell compartments. Many such cells can be arranged into a stack to form a battery.

Redox batteries containing a variety of electrolyte pairs have been developed and are designated by the metal ions of the salts dissolved to form the posilyte and negalyte pairs. Some examples are iron (+3)/iron(+2) (U.S. Pat. No. 4,069,371; U.S. Pat. No. 4,053,684), zinc (+2)/iron(+2), chromium (+3)/iron(+2), titanium (+3)/iron(+2), titanium (+3)/bromine (−1), and zinc (+2)/bromine (−1).

Physically, the separator membranes prevent the reactive fluids from mixing and causing internal shorting-out of the battery. More specifically, the separator must allow the current-carrying ions to pass freely between compartments, while restricting other ions from passing which can cause self-discharge.

Micro-porous separators, which are characterized by relatively large-size pores in the membrane (0.01 to 0.1 microns), have been used in redox cells. The ion exchange separators disclosed herein exhibit a higher coulombic efficiency and an easier control of the hydraulic flow through the stacked cells (battery) in the redox system.

It is an object of this invention to provide an improved redox-type electrochemical cell incorporating separator membranes which have low electrolytic resistance.

It is a further object to provide an improved redox-type electrochemical cell incorporating a membrane which exhibits a high selectivity against positive ion migration during operation of a cell and particularly which exhibits selectivity against ferric ion migration during operation of, for example, an iron (+3)/iron (+2) or chromium (+3)/iron (+2) redox cell.

It is further object of this invention to provide an improved redox-type electrochemical cell incorporating a membrane which exhibits long-term stability in acidic electrolytes.

It is a further object of this invention to provide an improved redox-type electrochemical cell incorporating a membrane which resists fouling during operation.

It is a further object of this invention to provide an improved redox-type electrochemical cell incorporating a membrane which exhibits efficient performance over a large number of charge/discharge cycles.

Still other objects and advantages of the present invention will be obvious and apparent to those skilled in the art from the specification and the appended claims.

BRIEF DESCRIPTION OF THE DRAWINGS

FIG. 1 summarizes the grafting process for the membrane of the present invention.

FIG. 2 is a graph of the percent graft versus electrolytic resistance in 1M $FeCl_2$/2M HCl.

FIG. 3 is a graph representing the diffusion profile of iron (+3) ion across various membranes of this invention.

FIG. 4 is a graph representing the rate of iron (+3) ion diffusion as a function of the area resistance of one of the membranes of the present invention.

FIG. 5 is a charge/discharge curve of an iron (+3)/iron(+2) redox cell in which the membranes of this invention are used.

BRIEF DESCRIPTION OF THE INVENTION

This invention relates to an improved redox-type electrochemical cells incorporating separator membranes comprising a polyolefin base film grafted with one or more vinyl-substituted monomers via gamma irradiation. The vinyl-substituted monomers useful in this invention may be any of those traditionally used to make separator membranes for electrochemical cells. Such monomers as 2- and 4-vinylbenzyl chloride, 2- and 4-vinylpyridine, styrene, and acrylic acid and methacrylic acid and their di(lower)alkylamino(lower)alkyl esters, are commonly employed in the radiation grafting process. The monomers are dissolved in solvents or solvent mixtures such as benzene, toluene, methylene chloride, water, or trichloroethylene. The redox system preferably involves circulating electrolyte pairs of the iron (+3)/iron(+2), zinc(+2)/iron(+2), chromium (+2)/iron(+3), titanium (+3)/iron(+2), titanium(+3)/bromine(−1) or zinc(+2)/bromine(−1) type. The separator membrane is preferably a polyolefin selected from the group comprising polypropylene, high density polyethylene, low density polyethylene, a perfluorinated polyolefin or a partially fluorinated polyolefin. The thickness of the base membrane may be from 0.5 to 10 mils, preferably about 1.0–7.0 mils.

DETAILED DESCRIPTION OF THE INVENTION

This invention relates to improved redox cells incorporating radiation grafted separator membranes.

The membranes of this invention are made from a 0.50–10.0 mil polyolefin base film which is grafted with one or more vinyl-substituted monomers via gamma radiation from a Cobalt-60 source.

Suitable polyolefin films include polypropylene, high density polyethylene, low density polyethylene, a perfluorinated polyolefin or a partially fluorinated polyolefin. Preferred 3.0–6.0 mil polyolefin films include the low density polyethylene film extruded from Bakelite B0602 (Union Carbide), the high density polyethylene film from Alathon 2074 (DuPont) and the polypropylene film from Olefane AT-36 (Crown Zellerbach). The commercially available rolls of polyolefin film may be optionally cross-linked prior to grafting by exposure to 1–100 Mrad., preferably to 70–90 Mrad. of beta radiation. Cross-linked membranes are generally subject to less swelling in electrolytes.

Suitable vinyl-substituted monomers include 4-vinylpyridine (VP), 2-vinylpyridine, 2-vinylbenzyl chloride, 4-vinylbenzyl chloride, styrene, acrylic acid (AA) and methacrylic acid (MA) and their di(lower)alkylamino(-lower)alkyl esters, wherein the term "(lower)alkyl" refers to a $C_1$–$C_4$ alkyl group, i.e. 2-N,N-dimethylamino-ethylmethacrylate. Preferred monomers for the monografted membranes of this invention are 4-vinylpyridine and acrylic acid. Radiation grafting of vinyl pyridine monomers to polyolefin films to provide membranes useful in fuel cells is disclosed in U.S. Pat. No. 4,230,549, and to provide membranes useful in alkaline secondary cells in V. D'Agostino and J. Y. Lee, U.S. Pat. No. 4,339,473 the disclosures of both of which are incorporated herein by reference.

Preferred solvents for the monomers or monomer mixtures are benzene, toluene, methylene chloride ($CH_2Cl_2$), trichloroethylene or water. Water and methylene chloride are preferred solvents for monomers sufficiently soluble therein, due to their low toxicity and non-inflammability.

In preparing a typical embodiment of the present invention, the polyolefin base film is wound with an interlayer of absorbent paper into a bulk roll which is then introduced into a stainless steel reactor vessel. A solution of one or more monomers in an appropriate solvent such as methylene chloride is then transferred into the reactor and the bulk roll allowed to soak for 24 hours, after which the system is evacuated to remove oxygen. The bulk roll is exposed to gamma radiation from a Cobalt-60 source to a predetermined total dose at ambient temperature. The bulk roll is then washed successively with 1% aqueous sulfuric acid, 2% aqueous sulfuric acid, and water. In some cases, a further wash with aqueous ferric ion has been demonstrated to lower the resistance of the membranes. The chemical reactions occurring in the grafting process which lead to 4-vinylpyridine polyolefin membranes are shown in FIG. 1.

When gamma radiation hits the polyolefin membrane, a free radical site is formed, which in the presence of 4-vinylpyridine or other unsaturated monomers, starts the graft polymerization. The properties of the ion exchange membrane are directly related to the percent graft. In general, the useful range of the percent graft is within the range of about 5 percent to 200 percent, and preferably about 10 percent to 100%, for example, a polypropylene grafted 4-vinylpyridine wherein the percent graft is 10 percent to 96 percent or a polyolefin grafted acrylic acid wherein the percent graft is 10–200%, preferably 40–70 percent. Percent graft is defined as the weight increase due to grafting divided by the initial weight of the polyolefin film multiplied by 100. Table I demonstrates the percent grafts obtained for fifteen radiation grafted membranes produced by varying the 4-vinylpyridine concentration for three types of polyolefin film while using a constant dose of Co-60 radiation. The percent grafts produced by grafting 20% acrylic acid in water to the three types of film is also given.

TABLE I

| | RADIATION GRAFTED MEMBRANES | | | | | |
|---|---|---|---|---|---|---|
| Separator No. | Base Film (3.0 mil) | Solvent | Monomer Concentration (% wt. in solvent) | Dose Rate | Total Dose | Percent Graft |
| 1 | Polypropylene (PP) | $CH_2Cl_2$ | 15 (VP) | 6889 rad/hr | 0.5 Mrad | 33 |
| 2 | Polypropylene (PP) | " | 20 (VP) | " | " | 49 |
| 3 | Polypropylene (PP) | " | 25 (VP) | " | " | 56 |
| 4 | Polypropylene (PP) | " | 30 (VP) | " | " | 99 |
| 5 | Polypropylene (PP) | " | 35 (VP) | " | " | 96 |
| 6 | Polypropylene (PP) | water | 20 (AA) | 7000 rad/hr | 0.33 | 45 |
| 7 | High Density Polyethylene (HDPE) | $CH_2Cl_2$ | 15 (VP) | 6889 rad/hr | 0.5 | 29 |
| 8 | High Density Polyethylene (HDPE) | " | 20 (VP) | " | " | 41 |

TABLE I-continued

RADIATION GRAFTED MEMBRANES

| Separator No. | Base Film (3.0 mil) | Solvent | Monomer Concentration (% wt. in solvent) | Dose Rate | Total Dose | Percent Graft |
|---|---|---|---|---|---|---|
| 9 | High Density Polyethylene (HDPE) | " | 25 (VP) | " | " | 60 |
| 10 | High Density Polyethylene (HDPE) | " | 30 (VP) | " | " | 97 |
| 11 | High Density Polyethylene (HDPE) | " | 35 (VP) | " | " | 146 |
| 12 | High Density Polyethylene (HDPE) | water | 20 (AA) | 7000 rad/hr | 0.33 | 50 |
| 13 | Low Density Polyethylene (LDPE) | $CH_2Cl_2$ | 15 (VP) | 6889 rad/hr | 0.5 | 28 |
| 14 | Low Density Polyethylene (LDPE) | " | 20 (VP) | " | " | 44 |
| 15 | Low Density Polyethylene (LDPE) | " | 25 (VP) | " | " | 80 |
| 16 | Low Density Polyethylene (LDPE) | " | 30 (VP) | " | " | 97 |
| 17 | Low Density Polyethylene (LDPE) | " | 35 (VP) | " | " | 114 |
| 18 | Low Density Polyethylene (LDPE) | water | 20 (AA) | 7000 rad/hr | 0.33 | 60 |

Grafted membranes, containing the pyridinyl functional groups, behave as weak anionic exchangers in the acidic electrolyte of the battery, allowing ions such as $Cl^-$ and $SO_4^{-2}$ ions to pass through, while blocking or resisting the passage of $Fe^{+3}$ ions. The grafted membranes are characterized by: (1) electrolytic resistance in various electrolytes; (2) rate of ferric ion diffusion; (3) chemical stability in the electrolyte; (4) long-term electrolytic resistance in ferric chloride; and, (5) cycle life testing.

The electrolytic resistance is an important indicator of the performance of a separator in working cells since it is directly related to the voltage loss in the cell. The electrolytic resistance of the grafted separator in turn is a function of the percent graft. FIG. 2 illustrates the relationship between resistance and percent graft in the series of vinyl pyridine-grafted separator membranes of Table I. At low percent graft, the resistance is very high and decreases rapidly as the percent graft increases. The resistance then levels off at a certain percent, which may be designated "the levelling percent graft". Further increase in percent graft beyond this point results in very little decrease in the resistance of the separator.

The electrolytic resistance of the vinylpyridine-grafted separator membranes of Table I was measured in two electrolytes, namely in 12 Be°/$H_2SO_4$ and in 2M HCl/1M $FeCl_3$. The results are outlined in Table II. Preferably the electrolytic resistance is within the range of 0.1 ohm-in$^2$ to 2 ohm-in$^2$ in 12°Be/$H_2SO_4$. The resistance will vary in different electrolytes.

TABLE II

ELECTROLYTIC RESISTANCES OF MEMBRANES AT 25° C.

| Film Type | % Graft of 4-Vinylpyridine | 1M $FeCl_3$/ 2M HCl | 12 Be°/$H_2SO_4$ |
|---|---|---|---|
| PP | 33% | 3.00 ohm-in$^2$ | 1.10 ohm-in$^2$ |
| " | 49 | 0.80 | 0.41 |
| " | 56 | 0.60 | 0.36 |
| " | 99 | 0.06 | 0.06 |
| " | 96 | 0.50 | 6.00 |
| HDPE | 29 | 0.50 | 0.89 |
| " | 41 | 0.40 | 0.32 |
| " | 60 | 0.15 | 0.21 |
| " | 97 | 0.08 | 0.08 |
| " | 146 | 0.40 | 0.14 |
| LDPE | 29 | 18.00 | 7.70 |
| " | 44 | 1.10 | 0.30 |
| " | 80 | 0.27 | 0.23 |
| " | 97 | 0.06 | 0.05 |
| " | 114 | 0.08 | 0.07 |

It has been found that the electrolytic resistance of separartor membranes formed by radiation grafting monomers to base films can be further lowered by exposing the grafted membranes to a solution of aqueous ferric ion. In a typical procedure, the finished membranes are boiled in water for a brief period, typically 5-30 minutes, transferred to a bath of 3M aqueous ferric chloride for 5-30 minutes and then washed with water to remove excess ferric ion, i.e., until the ferric ion concentration detected in the wash water is negligible. Comparative data on the resistivity of four of the separators of Table I is shown below in Table III.

TABLE III

FERRIC CHLORIDE-WASHED MEMBRANES

| Separator No. | Iron Impregnation* | Resistance (ohm/in$^2$) | | |
|---|---|---|---|---|
| | | 1M $FeCl_3$/2M HCl | 2M $FeCl_3$/2M HCl | 3M $FeCl_3$/2M HCL |
| 6 | Yes | 0.047 | 0.075 | 0.148 |

TABLE III-continued

FERRIC CHLORIDE-WASHED MEMBRANES

| Separator No. | Iron Impregnation* | Resistance (ohm/in²) 1M FeCl₃/2M HCl | 2M FeCl₃/2M HCl | 3M FeCl₃/2M HCL |
|---|---|---|---|---|
| 6 | No | 7.30 | 4.71 | >10 |
| 12 | Yes | 0.045 | 0.069 | 0.231 |
| 12 | No | 0.383 | 0.522 | >10 |
| 18 | Yes | 0.011 | 0.021 | 0.174 |
| 18 | No | 0.136 | 1.081 | >10 |
| 15 | Yes | 0.062 | 0.43 | 3.3 |
| 15 | No | 0.267 | 8.09 | >10 |

*15 minute boiling; 3M FeCl₃ bath, 15 minute exposure.

Although 3M ferric chloride solutions were used to impregnate the membranes of Table III with iron, it is expected that other ferric salts such as ferric sulfate and ferric nitrate would also be effective in this procedure. It is also expected that the concentration of ferric ion employed in the wash solution could be varied widely, for example, from about 0.5–4M, with a proportionate decrease in resistance of the washed membrane being attained as the ferric ion concentration is increased.

In the iron redox system, it is imperative to have as little ferric ion diffusing across the separator from the posilyte to the negalyte as possible, to minimize capacity loss. The ferric ion diffusion was tested in a batch dialyzer.

FIG. 3 is a plot of ferric ion concentration in the ferric lean side, caused by ferric ion diffision into the ferric lean side from the ferric rich side, as a function of time for the vinylpyridine-grafted membranes of Table II in a cell initially containing 1M FeCl₃ in 1N HCl in one half-cell and 1M HCl in the other cell. From the slope of the plot, the flux or the rate of ferric ion diffusion can be calculated by Fick's First Law. Depending on the electrolytic resistances and the nature of the base polyolefin films, the amount of ferric ion flux can be varied over several orders of magnitude, as shown in FIG. 4. FIG. 4 is a plot of the ferric ion diffusion rate versus the electrolytic resistance for the series of HDPE membranes of Table I. Such a plot allows prediction of the resistance of any given separator membrane once its rate of ferric ion diffusion has been determined.

Within the resistance range studied, the logarithm of the flux is approximately linear with the separators' electrolytic resistances. Thus by selecting a membrane of appropriate resistance, the selectivity against ferric ion diffusion may also be set. The highest resistance separator exhibits the best selectivity against ferric ion diffusion. However, too high an electrolytic resistance is unacceptable because it gives too large an IR drop across the separator. These are the trade-offs to be considered.

It has also been found that the rate of diffusion of ferric ion through the grafted membranes may be further reduced for any given set of grafting parameters by employing grafting solutions incorporating appropriately chosen monomer mixtures. Table IV compares the percent graft, resistance and ferric ion flux for a group of separators formed by grafting mixtures of 4-vinylpyridine and 2-N,N-dimethylaminoethyl methacrylate with the values obtained in the case of two typical 4-vinylpyridine monografted separators.

TABLE IV

CO-GRAFTED SEPARATORS

| *Separator No. | 4-Vinylpyridine (% wt. in solvent) | 2-N,N—Dimethyl-aminoethyl-methacrylate (% wt. in solvent) | % Graft | Resistance ohm/in² 1M FeCl₃/ 1M HCl | Fe⁺³ Flux |
|---|---|---|---|---|---|
| 19 | 25 | — | 65 | 0.98 | 0.0025 |
| 20 | 25 | — | 60 | 0.63 | 0.002 |
| 21 | 20 | 20 | 90 | 0.20 | 0.0056 |
| 22 | 15 | 15 | 56 | 1.20 | 0.002 |
| 23 | 15 | 20 | 34 | 0.80 | 0.002 |
| 24 | 10 | 10 | 35 | >1.0 | 0.000021 |

*Base film - 6.0 mil LDPE; solvent - CH₂Cl₂; radiation dose - 0.84 Mrad (7000 rad/hr) 19, 21–24; 0.5 Mrad (6889 rad/hr) 20; Flux Units - eq./in²/min.

Thus, it can be seen that while the monografted separators 19 and 20 exhibit acceptably low $Fe^{+3}$ flux given their resistance, the use of mixtures of monomers allows selective manufacture of separators of both higher and lower resistance which also exhibit acceptably low $Fe^{+3}$ flux levels. Separators 22 and 23, for example, achieve an equivalent or lower $Fe^{+3}$ flux at a resistance comparable to those exhibited by monografted separators 19 and 20, although their total percent graft is lower than either.

By adjusting the monomer ratios and total concentration of the monomer mixture used, a separator generally can be obtained which exhibits a lower resistance and $Fe^{+3}$ flux for any percent graft than that obtainable by use of either monomer component alone.

Likewise, a desirable lowering of the $Fe^{+3}$ flux relative to the resistance is noted when the following monomer pairs are employed in the grafting process.

(a) 2- or 4-vinylpyridine-2- or 4-vinyl benzyl chloride
(b) 2- or 4-vinylpridine-acrylic acid
(c) 2- or 4-vinylpyridine-methacrylic acid
(d) 2-N,N-dimethylaminoethyl methacrylate-acrylic acid
(e) 2-N,N-dimethylaminoethyl methacrylate-methacrylic acid
(f) 2- or 4-vinylbenzyl chloride-acrylic acid
(g) 2- or 4-vinylbenzyl chloride-methacrylic acid The amount of monomer mixture used is not critical, and as in the case of a single monomer grafting solution, may be adjusted upward to increase the percent graft obtained for any given radiation dose.

Not only must the separator be compatible in the electrolyte, but it must be stable to provide years of cycle life. Any degradation will affect the cell performance adversely. The chemical stability of the separators was evaluated in 2M HCl at 50° C. for one week by following any change in their electrolytic resistance. The results are depicted in Table V. No significant increase in the separators' electrolytic resistance is observed. If any of the ion exchange groups were lost, a significant increase in electrolytic resistance would be noted. The decreased resistance observed is due to the gradual conversion of the grafted monomer to the desirable ion-conductive form. The present data indicates that the separators would be stable in an acidic electrolyte, even at elevated temperatures.

TABLE V

CHEMICAL STABILITY OF MEMBRANES AFTER SOAKING IN 2M HCl at 50° C.

| Film Type | % Graft of 4-Vinyl-pyridine | 3 hrs. | 26 hrs. | 95 hrs. | 119 hrs. | 168 hrs. |
|---|---|---|---|---|---|---|
| PP | 33% | 1.1 ohm-in$^2$ | 0.85 | 0.76 | 0.68 | 0.70 ohm-in$^2$ |
| " | 49 | 0.16 | 0.12 | 0.12 | 0.13 | 0.13 |
| " | 56 | 0.11 | 0.10 | 0.08 | 0.09 | 0.09 |
| " | 99 | 0.04 | 0.04 | 0.03 | 0.03 | 0.05 |
| " | 96 | 0.11 | 0.08 | 0.07 | 0.07 | 0.08 |
| HDPE | 29 | 0.42 | 0.37 | 0.36 | 0.36 | 0.36 |
| " | 41 | 0.07 | 0.07 | 0.06 | 0.06 | 0.08 |
| " | 60 | 0.08 | 0.07 | 0.06 | 0.07 | 0.08 |
| " | 97 | 0.03 | 0.03 | 0.02 | 0.02 | 0.04 |
| " | 146 | 0.04 | 0.03 | 0.03 | 0.03 | 0.04 |
| LPDE | 28 | 1.18 | 1.04 | 1.01 | 1.02 | 1.05 |
| " | 44 | 0.25 | 0.21 | 0.20 | 0.21 | 0.22 |
| " | 66 | 0.10 | 0.09 | 0.08 | 0.09 | 0.09 |
| " | 97 | 0.06 | 0.05 | 0.04 | 0.05 | 0.06 |
| " | 114 | 0.11 | 0.09 | 0.08 | 0.08 | 0.09 |

Membrane fouling is a more serious problem with anionic exchange membranes than with cationic exchange membranes. Since the membranes of the present invention are anionic exchange membranes, fouling can be a problem. Generally, when fouling occurs in the anionic separator, there is an abrupt increase in the separator's electrolytic resistance, which then gives rise to a large voltage loss in the battery. Studies have shown that fouling of separators is caused by ferric ions which form a negatively charged complexes. See, *NASA-Redox Storage System Project, Industrial Briefing July 8-9, 1980, Ohio*. The electrolytic resistances of the membranes were measured after soaking in the 1M FeCl$_3$/2M HCl solution for a long period, as shown in Table VI. There is no significant increase in electrolytic resistance after more than one month of soaking in ferric chloride solution at room temperature. This result, plus that from cycle life testing, supports the conclusion that there is no significant membrane fouling in the membranes.

TABLE VI

FOULING BEHAVIOR OF MEMBRANES AFTER LONG TERM SOAKING IN 1M FeCl$_3$/2M HCl ELECTROLYTE AT ROOM TEMPERATURE

| FILM TYPE | % Graft of 4-Vinyl-pyridine | 0 hr | 2 DAY | 4 DAY | 8 DAY | ONE MONTH |
|---|---|---|---|---|---|---|
| PP | 33 | 3 ohm/in$^2$ | 3.0 | 3.0 | 2.6 | 3.3 |
| " | 49 | 0.80 | 0.80 | 0.80 | 0.70 | 0.70 |
| " | 56 | 0.60 | 0.60 | 0.60 | 0.60 | 0.60 |
| " | 99 | 0.06 | 0.18 | 0.10 | 0.10 | 0.10 |

TABLE VI-continued

FOULING BEHAVIOR OF MEMBRANES AFTER LONG TERM SOAKING IN 1M FeCl$_3$/2M HCl ELECTROLYTE AT ROOM TEMPERATURE

| FILM TYPE | % Graft of 4-Vinyl-pyridine | 0 hr | 2 DAY | 4 DAY | 8 DAY | ONE MONTH |
|---|---|---|---|---|---|---|
| " | 96 | 0.50 | 0.45 | 0.05 | 0.43 | 0.46 |
| HDPE | 29 | 0.50 | 0.60 | 0.70 | 0.60 | 0.70 |
| " | 41 | 0.40 | 0.42 | 0.44 | 0.50 | 0.44 |
| " | 60 | 0.15 | 0.21 | 0.21 | 0.23 | 0.22 |
| " | 97 | 0.08 | 0.08 | 0.15 | 0.08 | 0.13 |
| " | 146 | 0.40 | 0.14 | 0.20 | 0.29 | 0.21 |
| LPDE | 28 | 18.0 | 18.0 | 17.2 | 18.5 | 18.4 |
| " | 44 | 1.1 | 1.0 | 1.1 | 1.0 | 1.0 |
| " | 66 | 0.50 | 0.53 | 0.50 | 0.60 | 0.55 |
| " | 97 | 0.06 | 0.05 | 0.04 | 0.06 | 0.05 |
| " | 114 | 0.08 | 0.08 | 0.09 | 0.09 | 0.08 |

Cycle testing was done with a 60-in$^2$ single cell employing the HDPE membrane series of Table II as shown in FIG. 5. More than 100 charge-discharge cycles over a period of 6 months were obtained with no significant degradation in cell performance. The cell parameters are given in Table VII.

TABLE VII

CELL PARAMETERS IN CYCLE LIFE TESTING

| Cell Type: | Single cell, encapsulated |
|---|---|
| Active cell area: | 60-in$^2$ |
| Electrodes: | Carbon electrodes fabricated at GEL by "Wil-Mat" method. |
| Electrolyte: | 3 Molar FeCl$_2$ |
| Posilyte Volume: | 1 liter |
| Negalyte Volume: | 500 ml |
| Electrode Spacing | 0.30 inches |
| Charging Mode: | Constant current from 3 to 10 ampere to a cut off of 1.8 volt |
| Discharge Mode: | Constant current from 2 to 8 amperes to a cut off of 0.80 volt |

An example of a charge and discharge curve for the series of VP-HDPE membranes of Table II is shown in FIG. 5, in which a coulombic efficiency, defined as ampere-hour input over amper-hour output, of 91% was obtained. Cycles usually show a coulombic efficiency of at least 85% and upward. This is contrasted to the coulombic efficiency of about 60 to 75% using a microporous separator. (See, U.S. Pat. No. 4,069,371, Ex. 4). Results of this cycle testing can be briefly summarized as follows: (1) coulombic efficiencies are in the range of 85% minimally to over 95% under controlled conditions; (2) polarization voltage losses are in the order of 7%, or less than 10% of the total charging potential; (3) membrane properties are such that maximum volume changes during cycling are within 10% of total electrolyte volume. Even though the negalyte volumes decrease during charging, they always return to essentially the original value during discharge; (4) transport numbers of ions through the membrane depend upon pH, solution concentration and probably current densities. The membranes of the present invention are anionic, but the transport number $t^-$ is not unity, nor is $t^+$ zero; (5) no bulk fluid transfer was observed; and, (6) no mechanical problems were encountered in handling or during operation.

Radiation grafting is a valuable process to make ion exchange membranes. By optimizing the grafting parameters and the related properties of electrolytic resistance and ferric ion flux, a separator for the redox battery can be "tailor-made". Such a separator is low cost and can be mass-produced in a continuous or batch process.

This invention has been described in terms of the specific embodiments set forth herein in detail. Alternative embodiments and modifications will be apparent to those skilled in the art from this disclosure, and, accordingly, such embodiments and modifications are within the spirit and scope of this invention as described and claimed herein.

What is claimed is:

1. In an improved redox electrochemical cell incorporating two chemically-inert electrodes of opposite polarity, at least one aqueous acidic electrolyte, and a separator membrane between the adjacent electrodes, the improvement comprising an anion exchange separator membrane formed by grafting a polyolefin film to the extent of 5-200% with one or more vinyl substituted monomers via gamma irradiation and subsequently impregnating the grafted film with iron by exposing said film to an aqueous solution of ferric ion.

2. The redox cell of claim 21 wherein the grafted film is impregnated with iron by boiling the film in water, bathing the boiled film in an aqueous solution containing ferric ion and washing the film with water.

3. The redox cell of claim 2 wherein the aqueous solution contains ferric chloride.

4. The redox cell of claim 3 wherein the aqueous solution is an 0.5-4.0M solution of ferric chloride.

5. The redox cell of claim 4 wherein the iron-impregnated separator is prepared by boiling the grafted film in water for 5-30 minutes, bathing the boiled film in about 3M aqeuous ferric chloride for about 5-30 minutes, and washing the film with water to remove excess ferric ion.

6. The redox cell of claims 1 wherein the polyolefin film has been radiation-crosslinked prior to grafting.

7. In an improved redox electrochemical cell incorporating two chemically-inert electrodes of opposite polarity, at least one aqueous acidic electrolyte, and a separator membrane between the adjacent electrodes, the improvement comprising an anion exchange separator membrane formed by grafting a polyolefin film to the extent of 5-200% with two monomers selected from the group consisting of 2-vinyl-pyridine, 4-vinyl-pyridine, 2-N,N-dimethyl-aminoethyl methacrylate, 2-vinylbenzyl chloride, 4-vinylbenzyl-chloride, acrylic acid, methacrylic acid and 2-N,N-dimethyl-aminoethyl acrylate.

8. The redox cell of claim 7 wherein the two monomers are selected from the group consisting of:

2- or 4-vinylpyridine and 2-N,N-dimethylaminoethyl methacrylate;

2- or 4-vinylpyridine and 2- or 4-vinylbenzyl chloride;

2- or 4-vinylpyridine and acrylic acid;

2- or 4-vinylpyridine and methacrylic acid;

2-N,N-dimethylaminoethyl methacrylate and acrylic acid;

2-N,N-dimethylaminoethyl methacrylate and methacrylic acid;

2- or 4-vinylbenzyl chloride and acrylic acid; and 2- or 4-vinylbenzyl chloride and methacrylic acid.

9. The redox cell of claim 8 wherein the film is low density polyethylene, the monomer pair is 4-vinylpyridine and 2-N,N-dimethylaminoethyl methacrylate, and the percent graft is 10-100% of the membrane weight.

10. The redox cell of claim 7 wherein the polyolefin film has been radiation-crosslinked prior to grafting.

* * * * *

UNITED STATES PATENT AND TRADEMARK OFFICE
CERTIFICATE OF CORRECTION

PATENT NO. : 4,468,441
DATED : August 28, 1984
INVENTOR(S) : Vincent F. D'Agostino and Joseph Y. Lee It is certified that error appears in the above-identified patent and that said Letters Patent is hereby corrected as shown below:

Column 11, Line 23, change "21" to -- 1 --

Signed and Sealed this

Twenty-sixth Day of February 1985

[SEAL]

Attest:

DONALD J. QUIGG

Attesting Officer  Acting Commissioner of Patents and Trademarks